United States Patent
Iwasaki (10) Patent No.: US 7,369,580 B2
(45) Date of Patent: May 6, 2008

(54) AMPLITUDE LIMITING CIRCUIT AND CDMA COMMUNICATION APPARATUS

(75) Inventor: Motoya Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 896 days.

(21) Appl. No.: 10/642,614

(22) Filed: Aug. 19, 2003

(65) Prior Publication Data

US 2004/0047317 A1    Mar. 11, 2004

(30) Foreign Application Priority Data

Aug. 22, 2002    (JP)    ............................ 2002-241830

(51) Int. Cl.
    H04J 3/04    (2006.01)
(52) U.S. Cl. .................. 370/533; 370/342; 370/441; 375/297
(58) Field of Classification Search ............. 370/335, 370/342, 441, 533; 375/146, 268, 297, 300, 375/301
    See application file for complete search history.

(56) References Cited

U.S. PATENT DOCUMENTS

| | | | |
|---|---|---|---|
| 5,287,387 A | 2/1994 | Birchler et al. | |
| 5,638,403 A | 6/1997 | Birchler et al. | |
| 5,710,990 A | 1/1998 | Long et al. | |
| 5,742,900 A | 4/1998 | Arnstein et al. | |
| 5,751,705 A * | 5/1998 | Sato ............................ | 370/335 |
| 6,144,694 A * | 11/2000 | Uta et al. ..................... | 375/146 |
| 6,236,864 B1 * | 5/2001 | McGowan et al. .......... | 455/522 |
| 6,266,320 B1 * | 7/2001 | Hedberg et al. ............. | 370/206 |
| 6,434,135 B1 | 8/2002 | Ozluturk | |
| 6,636,555 B1 * | 10/2003 | Frank et al. ................. | 375/146 |
| 6,931,239 B2 * | 8/2005 | Hongo et al. ................ | 455/103 |
| 7,095,798 B2 * | 8/2006 | Hunton ........................ | 375/296 |
| 7,170,952 B2 * | 1/2007 | Hunton ........................ | 375/296 |

FOREIGN PATENT DOCUMENTS

| | | |
|---|---|---|
| EP | 0 743 768 A1 | 11/1996 |
| EP | 0 751 630 A2 | 1/1997 |
| JP | 08079132 | 3/1996 |
| JP | 10-111354 | 4/1998 |
| JP | 2001-285088 | 10/2001 |

OTHER PUBLICATIONS

European Search Report dated Oct. 13, 2005.
European Search Report dated Apr. 7, 2004.

* cited by examiner

Primary Examiner—Ricky Q. Ngo
Assistant Examiner—Gary Mui
(74) Attorney, Agent, or Firm—McGinn IP Law Group, PLLC (57) ABSTRACT

An amplitude limiting circuit for limiting the amplitude of a signal input to a power amplifier includes an amplitude converter, determination unit, peak detector, window filter, delay circuit, and multiplier. The amplitude converter calculates the amplitude value of an input signal. The determination unit detects an interval in which the amplitude value of the input signal exceeds a preset threshold. The peak detector detects the peak time and amplitude when the maximum amplitude appears. The window filter limits the amplitude value to not more than the threshold by using the peak value output from the peak detector. The delay circuit delays the input signal such that the peak time output from the peak detector coincides with the time when the output from the window filter exhibits the minimum value. The multiplier multiplies an output signal from the delay circuit by a window function. A CDMA communication apparatus is also disclosed.

9 Claims, 7 Drawing Sheets

PRIOR ART

FIG. 6

PRIOR ART

PRIOR ART

AMPLITUDE LIMITING CIRCUIT AND CDMA COMMUNICATION APPARATUS

BACKGROUND OF THE INVENTION

The present invention relates to an amplitude limiting circuit and, more particularly, to an amplitude limiting circuit which can be suitably used to limit an input to a transmission power amplifier incorporated in a CDMA communication apparatus.

Recent digital mobile communication systems often use CDMA (Code Division Multiple Access) communication apparatuses to improve the interference resistance ability between communication channels.

In a CDMA communication apparatus, since the instantaneous power at the time of transmission is much higher than the average power, the linearity of a transmission power amplifier must be maintained up to a very high output level to suppress spreading of a transmission spectrum due to nonlinear distortion so as to reduce adjacent channel leakage power.

Figure 5:
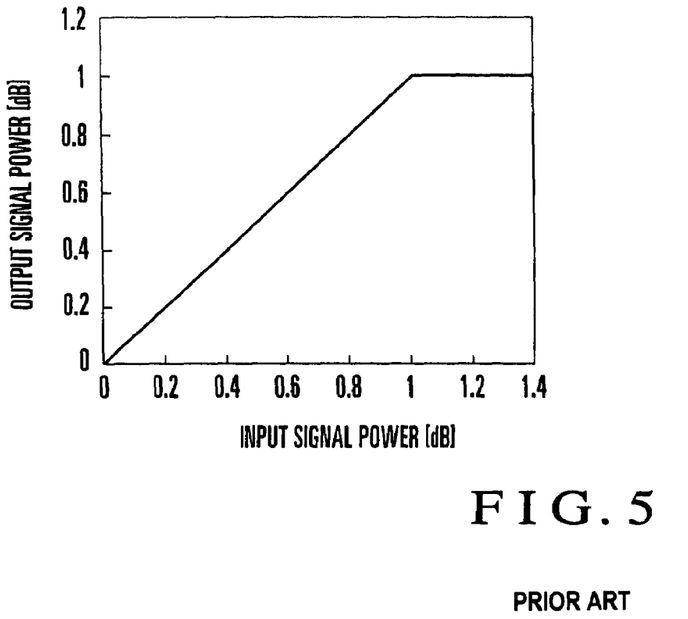
FIG. 5 is a graph showing the input/output characteristics of a transmission power amplifier incorporated in the CDMA communication apparatus.

A power amplifier designed to have good linearity up to a very high amplitude has a large circuit size, and hence increases in cost and power consumption. For this reason, as a transmission power amplifier for a CDMA communication apparatus, a nonlinear compensation amplifier is used, which exhibits good linearity with respect to small amplitude components and nonlinearity with respect to large amplitude components. As shown in FIG. 5, the linearity of this nonlinear compensation amplifier has the input/output characteristics that linearity is maintained up to its maximum output, and when an input amplitude exceeds a value corresponding to the maximum output, the output level becomes constant.

Figure 6:
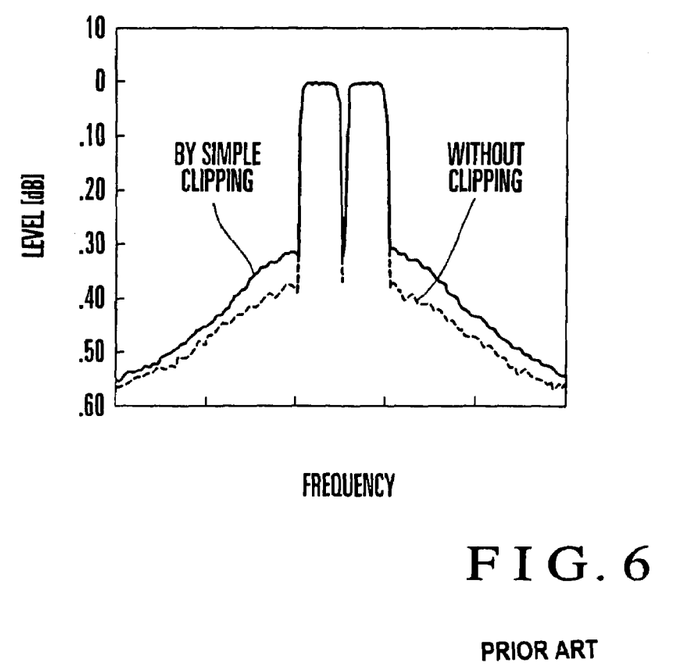
FIG. 6 is a graph showing the transmission spectra respectively obtained without clipping an input signal to the transmission power amplifier having the input/output characteristics shown in FIG. 5 and by simply clipping the input signal.

In a transmission power amplifier having input/output characteristics like those shown in FIG. 5, when a signal corresponding to a level exceeding the maximum output is input, a transmission output is saturated to increase nonlinear distortion. As a consequence, the transmission spectrum spreads to increase adjacent channel leakage power, as indicated by the spectrum waveform without "CLIPPING" in FIG. 6.

It is therefore desirable to maximize the saturation power (maximum output) of the transmission power amplifier. In this case, however, as described above, the circuit size increases to increase power consumption and cost. For this reason, it is important in the CDMA communication apparatus that the instantaneous maximum power of an input signal is limited so as not to exceed the saturation power of the transmission power amplifier.

Figure 7:
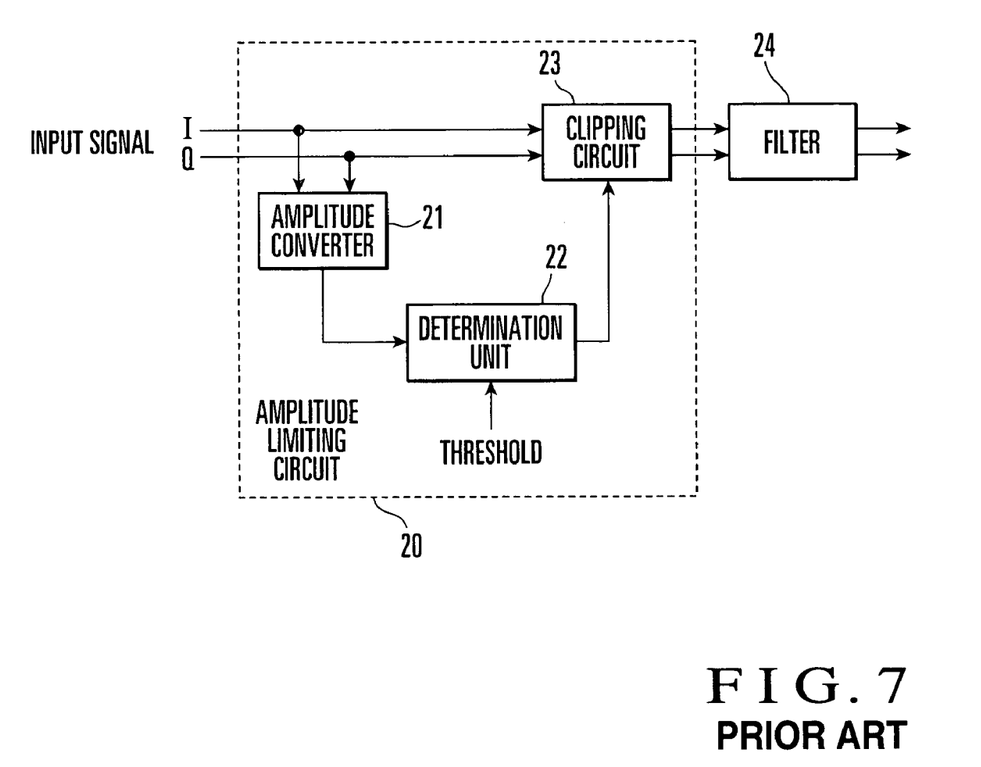
FIG. 7 is a block diagram showing the arrangement of a conventional amplitude limiting circuit.

The simplest method of limiting the input amplitude of the transmission power amplifier is to clip an input signal with a predetermined value. If, however, an input signal is simply clipped, the nonlinear distortion of a signal waveform increases. As a result, the transmission spectrum further spreads, as indicated by the spectrum waveform obtained by "SIMPLE CLIPPING" in FIG. 6. As shown in FIG. 7, therefore, an amplitude limiting circuit is generally provided before a band limiting filter.

An amplitude limiting circuit 20 shown in FIG. 7 includes an amplitude converter 21 which calculates the amplitude value of an input signal constituted by an in-phase component I and quadrature component Q, a determination unit 22 which compares the amplitude value calculated by the amplitude converter 21 with a preset threshold to output a control value for limiting the amplitude of an input signal that exceeds the threshold, and a clipping circuit 23 which limits an output amplitude to a value equal to or less than the threshold in accordance with the control value output from the determination unit 22.

Of an output signal from the amplitude limiting circuit 20, only a predetermined baseband component is output from a filter 24. In this arrangement, since the frequency component of an output signal is limited by the filter 24 within a predetermined band, the transmission spectrum does not spread.

In the arrangement shown in FIG. 7, however, since the amplitude limiting circuit and filter 24 differ in their sampling rates for signal processing, level variations occur at the time of sampling. As a result, the amplitude of the signal passing through the filter 24 may increase again.

Figure 8:
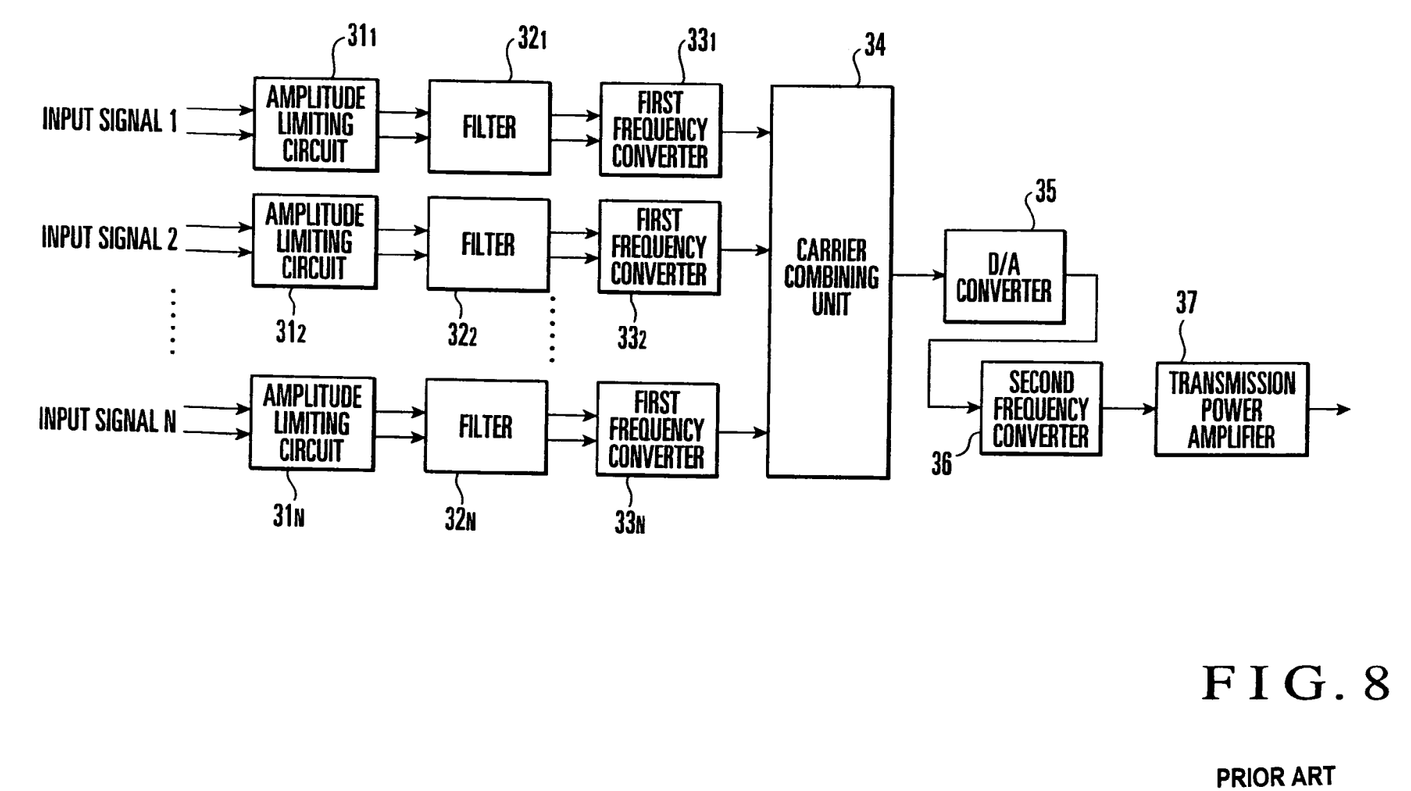
FIG. 8 is a block diagram showing the arrangement of a CDMA communication apparatus including the amplitude limiting circuit shown in FIG. 7.

In addition, when the amplitude limiting circuit shown in FIG. 7 is applied to a CDMA communication apparatus of a so-called multicarrier amplification scheme of combining a plurality of carrier signals, shown in FIG. 8, the amplitude of the signal is increased again by processing after amplitude limitation.

The CDMA communication apparatus shown in FIG. 8 includes a plurality of amplitude limiting circuits $31_1$ to $31_N$ (N is a positive integer) which limit the amplitudes of input signals and a plurality of filters $32_1$ to $32_N$ which pass only predetermined band components.

The CDMA communication apparatus also includes first frequency converters $33_1$ to $33_N$ which convert input signals as baseband signals into signals having different frequencies for the respective channels, and a carrier combining unit 34 which combines output signals from the first frequency converters $33_1$ to $33_N$.

The CDMA communication apparatus further includes a D/A converter 35 which converts the signal obtained by carrier combining into an analog signal, a second frequency converter 36 which converts the output signal from the D/A converter 35 into an RF signal, and a transmission power amplifier 37 which amplifies the RF signal to power necessary for transmission.

The CDMA communication apparatus includes the amplitude limiting circuits $31_1$ to $31_N$, filters $32_1$ to $32_N$, and first frequency converters $33_1$ to $33_N$ for the respective channels.

Figure 9:
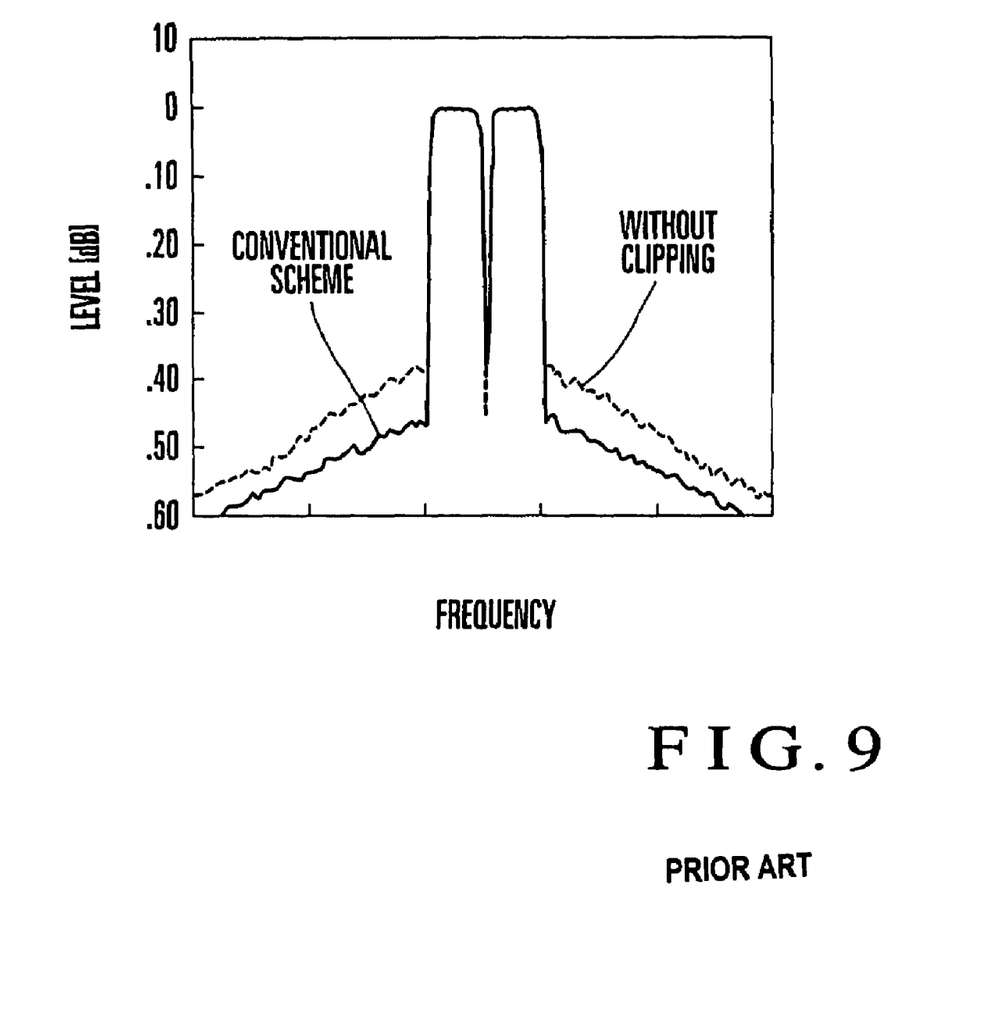
FIG. 9 is a graph showing a transmission spectrum from the CDMA communication apparatus shown in FIG. 8.

In this arrangement, since signals corresponding to a plurality of channels are subjected to vector combining in the carrier combining unit 34 after amplitude limitation, the effect of the amplitude limitation is lost. As a consequence, the transmission spectrum spreads, as indicated by the spectrum waveform of "CONVENTIONAL SCHEME" in FIG. 9.

SUMMARY OF THE INVENTION

The present invention has been made to solve the above problems in the prior art, and has as its object to provide an amplitude limiting circuit which can be effectively used to limit an input to a transmission power amplifier incorporated in a CDMA communication apparatus.

In order to achieve the above object, according to the present invention, there is provided an amplitude limiting circuit for limiting an amplitude of a signal input to a power amplifier, comprising an amplitude converter which calculates an amplitude value of an input signal, a determination unit which detects, as a detection interval, an interval in which the amplitude value exceeds a threshold, on the basis of a preset threshold and the amplitude value of the input signal, a peak detector which detects, in the detection interval, a peak time when a maximum amplitude value appears and an amplitude value at the peak time as a peak value, a window filter which generates a window function for limiting the amplitude value to a value not more than the threshold by using the peak value output from the peak detector, a delay circuit which delays the input signal such that the peak time output from the peak detector coincides with time when the window function output from the window filter exhibits a minimum value, and a multiplier which multiplies an output signal from the delay circuit by the window function.

DESCRIPTION OF THE PREFERRED EMBODIMENT

The present invention will be described next with reference to the accompanying drawings.

Figure 1:
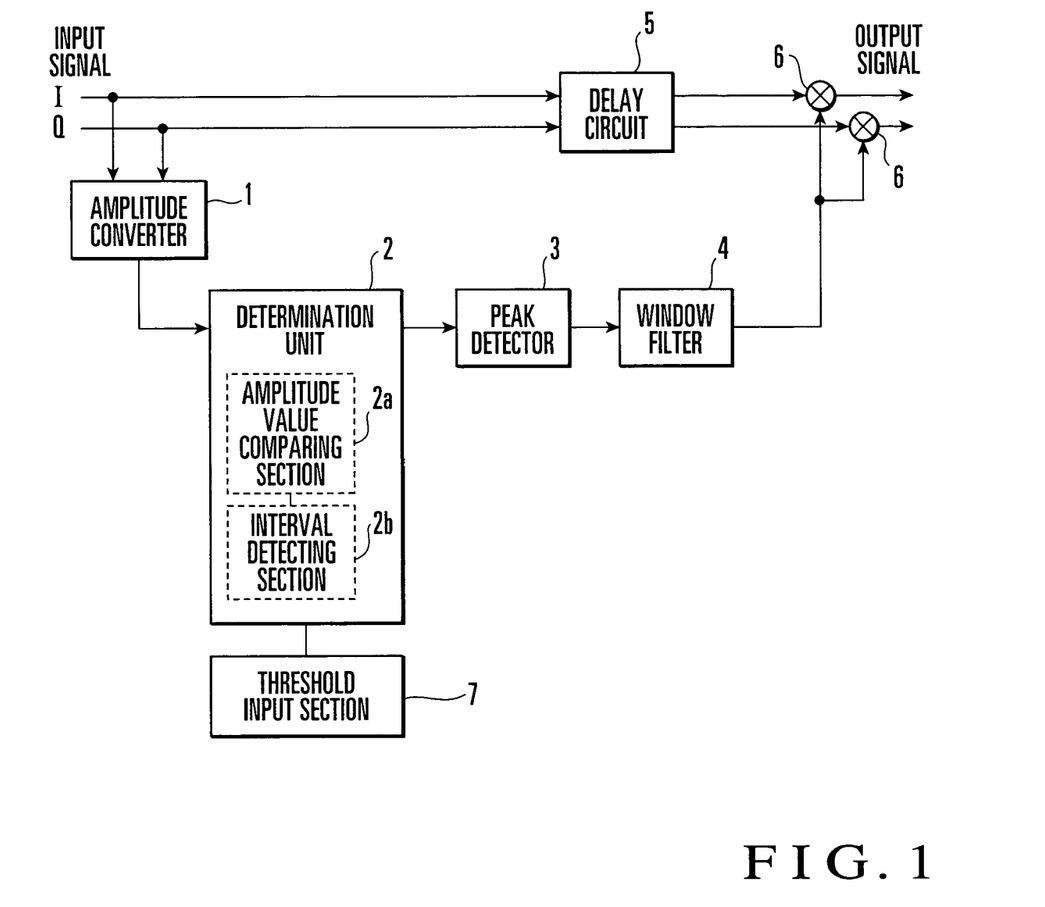
FIG. 1 is a block diagram showing an example of the arrangement of an amplitude limiting circuit according to the present invention.

As shown in FIG. 1, an amplitude limiting circuit according to the present invention includes an amplitude converter 1 which calculates the amplitude value of an input signal constituted by an in-phase component I and quadrature component Q and a determination unit 2 which is connected to the amplitude converter 1 and compares a preset threshold with an output value from the amplitude converter to detect an interval in which the amplitude value of the input signal exceeds the threshold.

The amplitude limiting circuit also includes a peak detector 3 which is connected to the determination unit 2 and detects, in the interval in which the amplitude value of the input signal exceeds the threshold, the time (peak time) when the maximum amplitude value appears and the maximum value (peak value), and a window filter 4 which is connected to the peak detector 3 and generates a predetermined window function by using the values detected by the peak detector 3.

In addition, the amplitude limiting circuit includes a delay circuit 5 which delays the input signal by a predetermined delay amount and a multiplier 6 which is connected to the delay circuit 5 and multiplies an output signal from the delay circuit 5 by the window function generated by the window filter 4.

As shown in FIG. 1, the input signal to the amplitude limiting circuit is a signal which is constituted by the in-phase component I and quadrature component Q and has undergone filtering processing and carrier combining.

The amplitude converter 1 calculates an amplitude value P of the input signal from the in-phase component I and quadrature component Q by $$P=(I^2+Q^2)^{1/2} \tag{1}$$

The determination unit 2 includes an amplitude value comparing section 2a which compares the amplitude value calculated by the amplitude converter 1 with a threshold to determine whether or nor the amplitude value exceeds the threshold, and interval detecting section 2b which detects an interval in which the amplitude value of the input signal exceeds the threshold.

Note that the threshold is set by a threshold input section 7 in advance to a value equal to or less than an input amplitude at which the output of a transmission power amplifier located after the amplitude limiting circuit is not saturated.

In the interval in which it is determined that the amplitude value of the input signal exceeds the threshold, the peak detector 3 outputs the peak time when the maximum amplitude value appears and the peak value at the peak time.

The window filter 4 outputs a window function which exhibits a value of 1 before and after a preset correction interval longer than the interval in which the amplitude value of the input signal exceeds the threshold, and makes the value at the center of the correction interval proportional to the reciprocal of the peak value.

The delay circuit 5 delays the input signal such that the peak time coincides with the center of the correction interval. The signal output from the delay circuit 5 is multiplied by the window function output from the window filter 4.

Figure 2:
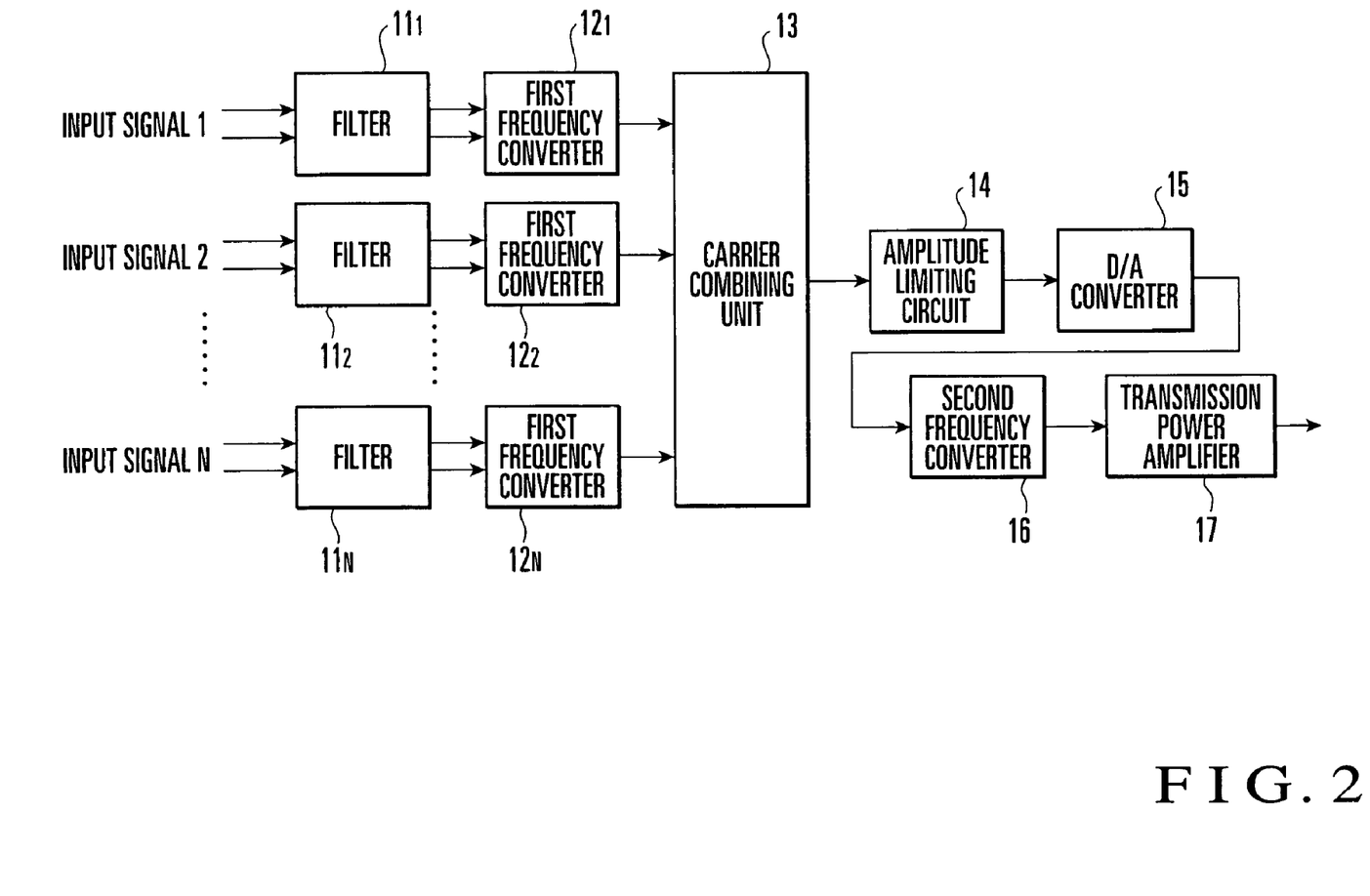
FIG. 2 is a block diagram showing an example of the arrangement of a CDMA communication apparatus having the amplitude limiting circuit shown in FIG. 1.

As shown in FIG. 2, a CDMA communication apparatus of this embodiment includes a plurality of filters $11_1$ to $11_N$ (N is a positive integer) which pass only predetermined band components, and a plurality of first frequency converters $12_1$ to $12_N$ which are respectively connected to the filters $11_1$ to $11_N$ and convert baseband signals passing through the filters into signals with different frequencies for the respective channels.

The CDMA communication apparatus also includes a carrier combining unit 13 which is connected to the first frequency converters $12_1$ to $12_N$ and combines output signals from the first frequency converters $12_1$ to $12_N$, and an amplitude limiting circuit 14 which is connected to the carrier combining unit 13 and limits the amplitude of the signal obtained by carrier combining.

In addition, the CDMA communication apparatus includes a D/A converter 15 which is connected to the amplitude limiting circuit 14 and converts the amplitude-limited signal into an analog signal, a second frequency converter 16 which is connected to the D/A converter 15 and converts an output signal from the D/A converter 15 into an RF signal, and a transmission power amplifier 17 which is connected to the second frequency converter 16 and amplifies the RF signal to power necessary for transmission.

That is, the CDMA communication apparatus includes a filter 11 and first frequency converter 12 for each channel.

In this arrangement, since amplitude limitation is performed with respect to the signal obtained by filtering by the filters $11_1$ to $11_N$ and carrier combining, there is no chance that the signal amplitude increases again by processing after amplitude limitation as in the prior art.

The operation of the amplitude limiting circuit according to the present invention will be described next with reference to FIGS. 3 and 4.

In the amplitude limiting circuit of this embodiment, the amplitude converter 1 converts an input signal into an amplitude value, and the determination unit 2 compares the amplitude value with a preset threshold. If the amplitude value exceeds the threshold, the peak detector 3 detects the peak time when the maximum amplitude appears and the peak value at the time.

Figure 3:
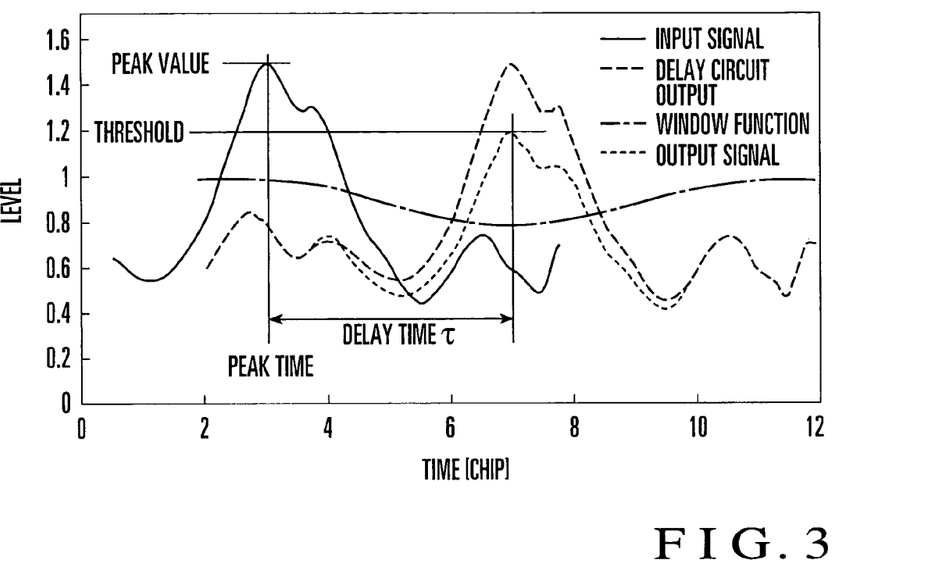
FIG. 3 is a signal waveform chart showing the operation of the amplitude limiting circuit shown in FIG. 1.
Figure 4:
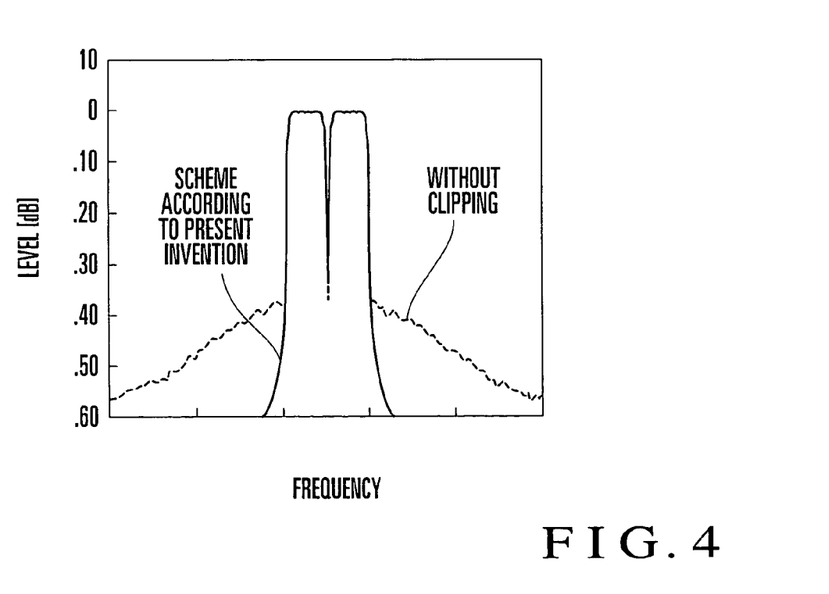
FIG. 4 is a graph showing the transmission spectrum of a signal processed by the amplitude limiting circuit shown in FIG. 1.

The window filter 4 generates a function exhibiting a value which is 1 until the peak value, gradually decreases thereafter to become A (=threshold/peak value) after a lapse of a time τ, and gradually increases thereafter to return to 1 after a lapse of the time τ (see "WINDOW FUNCTION" in FIG. 3).

In this case, τ is set in advance to a value half a value corresponding to a time longer than the interval in which the input signal exceeds the threshold. For example, a value about 10 to 20 times the chip period is used.

Note that the chip period is the reciprocal of the spreading frequency (=chip rate) used in the CDMA communication apparatus. Referring to FIG. 3, the unit of time on the abscissa is represented by "CHIP", which indicates that a given time corresponds to a specific multiple of the chip rate.

The input signal is delayed by the time τ by the delay circuit 5 (see "DELAY CIRCUIT OUTPUT" in FIG. 3). This signal is then multiplied by the window function generated by the window filter 4, and the resultant signal is output (see "OUTPUT SIGNAL" in FIG. 3). At this time, the multiplier 6 outputs a signal which is wave-shaped such that the peak value is equal to or less than the threshold.

The window filter 4 generates, for example, a window function w(t) represented by $$w(t) = \begin{cases} 1 - a\left(1 - \cos\left(\frac{\pi t}{\tau}\right)\right) & (0 < t < 2\tau) \\ 1 & (t < 0, 2\tau < t) \end{cases}$$

In this case, when t=τ, it suffices if w(t)=1−2a≦A. For example, a=(1−A)/2 is set.

As shown in FIG. 2, in the CDMA communication apparatus of this embodiment, since amplitude limitation is performed with respect to the signal obtained by filtering by the filters and carrier combining, there is no chance that the signal amplitude increases again by processing after amplitude limitation as in the prior art.

Therefore, this apparatus is free from nonlinear distortion which is caused when a transmission output from the transmission power amplifier 17 on the output stage is saturated, and hence spreading of a transmission spectrum is suppressed. This makes it possible to suppress adjacent channel leakage power.

The amplitude limiting circuit of this embodiment smoothly limits the amplitude of an input signal by using a window function instead of simply clipping the input signal. This prevents the occurrence of nonlinear distortion due to amplitude limitation processing, and hence suppresses spreading of a transmission spectrum as indicated by the waveform based on "SCHEME ACCORDING PRESENT INVENTION".

The present invention is configured in the above manner, and hence has the following effects.

An amplitude limiting circuit according to the present invention includes an amplitude converter which calculates the amplitude value of an input signal, and a determination unit which compares a preset threshold with the amplitude value of the input signal to detect an interval in which the amplitude value exceeds the threshold.

The amplitude limiting circuit also includes a peak detector which detects, in the interval in which the amplitude value of the input signal exceeds the threshold, the peak time when the amplitude value of the input signal becomes maximum and the amplitude value at the peak time, and a window filter which generates a window function for limiting the amplitude value of the input signal to a value equal to or less than the threshold by using the peak value.

The amplitude limiting circuit further includes a delay circuit which delays the input signal such that the peak time coincides with the time when the window function exhibits the minimum value, and a multiplier which multiplies an output signal from the delay circuit by the window function.

With this operation, the amplitude of the input signal is limited to a value equal to or less than the threshold by using the window function, and hence no nonlinear distortion is caused by amplitude limitation processing. This makes it possible to suppress spreading of the transmission spectrum.

A CDMA communication apparatus according to the present invention includes a plurality of filters which pass predetermined band components containing input signals, and a plurality of first frequency converters which convert the signals passing through the filters into signals with different frequencies for the respective channels.

The CDMA communication apparatus also includes a carrier combining unit which combines output signals from the first frequency converters, the above amplitude limiting circuit which limits the amplitude of an output signal from the carrier combining unit, and a D/A converter which converts an output signal from the amplitude limiting circuit into an analog signal.

The CDMA communication apparatus further includes a second frequency converter which converts the analog signal into an RF signal, and a transmission power amplifier which amplifies the RF signal to power necessary for transmission.

With this operation, the amplitude of an output signal from the carrier combining unit is limited by the above amplitude limiting circuit to perform amplitude limitation with respect to the signal obtained by filtering by the baseband filters and carrier combining. This prevents the signal amplitude from increasing again due to processing after amplitude limitation as in the prior art.

Therefore, this apparatus is free from nonlinear distortion which is caused when a transmission output from the transmission power amplifier on the transmitting side is saturated, and hence spreading of a transmission spectrum is suppressed. This makes it possible to suppress adjacent channel leakage power.

What is claimed is:

1. An amplitude limiting circuit for limiting an amplitude of a signal input to a power amplifier, comprising:

an amplitude converter which calculates an amplitude value of an input signal;

a determination unit which detects, as a detection interval, an interval in which the amplitude value exceeds a threshold, on a basis of a preset threshold and the amplitude value of the input signal;

a peak detector which detects, in the detection interval, a peak time when a maximum amplitude value appears and said maximum amplitude value at the peak time as a peak value;

a window filter which generates a window function for limiting the amplitude value to a value not more than the threshold by using the peak value output from said peak detector;

a delay circuit which delays the input signal such that the peak dine output from said peak detector coincides with a time when the window function output from said window filter exhibits a minimum value; and a multiplier which multiplies an output signal from said delay circuit by the window function, wherein said input signal comprises an in phase component I and a quadrature component O, and said amplitude value of said input signal comprises $(I^2+O^2)^{1/2}$.

2. A circuit according to claim 1, wherein said determination unit comprises an amplitude comparing section which compares the preset threshold with the amplitude value of the input signal, and an interval detecting section which detects an interval in which the amplitude value exceeds the threshold.

3. A circuit according to claim 1, wherein said window function exhibits a value of 1 before and after a preset correction interval longer than the detection interval and makes a value at a center of the correction interval proportional to a reciprocal of the peak value, and said delay circuit delays the input signal such that the peak time coincides with the center of the correction interval.

4. A circuit according to claim 3, wherein said window function exhibits a value which is 1 until the peak value and becomes not more than a value (threshold/peak value) at the center of the correction interval after the peak time.

5. A circuit according to claim 3, wherein letting threshold/peak value A, a=(1−A)/2, and τ be a value ½ a preset correction interval, said window filter outputs a window function w(t) represented by $$w(t) = \{1 - a(1 - \cos(\pi t/\tau)) \quad (0 < t < 2\tau)$$
$$1 \quad (t < 0, 2\tau < t)$$

and said delay circuit delays the input signal by the time τ.

6. A circuit according to claim 1, further comprising a threshold input section which inputs a threshold to said determination unit.

7. A CDMA communication apparatus comprising:

a plurality of filters which pass predetermined band components containing input signals;

a plurality of first frequency converters which convert the signals passing through said filters into signals with different frequencies for the respective channels;

a carrier combining unit which combines the output signals from said first frequency converters;

an amplitude limiting circuit which limits an amplitude of an output signal from said carrier combining unit, said amplitude limiting circuit comprising:

an amplitude converter which calculates an amplitude value of an input signal, a determination unit which detects, as a detection interval, an interval in which the amplitude value exceeds a threshold, on a basis of a preset threshold and the amplitude value of the input signal, a peak detector which detects, in the detection interval, a peak time when a maximum amplitude value appears and an amplitude value at the peak time as a peak value, a window filter which generates a window function for limiting the amplitude value to a value not more than the threshold by using the peak value output from said peak detector, a delay circuit which delays the input signal such that the peak time output from said peak detector coincides with a time when the window function output from said window filter exhibits a minimum value, and a multiplier which multiplies an output signal from said delay circuit by the window function;

a D/A converter which converts an output signal from said amplitude limiting circuit into an analog signal;

a second frequency converter which converts the analog signal into an RF signal; and a transmission power amplifier which amplifies the RF signal to power necessary for a transmission, and wherein said delay circuit delays said input signal by a lapse time τ, where τ comprises a value set in advance to half a value corresponding to a time longer than an interval in which said input signal exceeds said threshold.

8. An apparatus according to claim 7, wherein τ further comprises a value between 10 and 20 times a chip period used, where said chip period is a reciprocal of a spreading frequency used in said CDMA communication apparatus.

9. An apparatus according to claim 8, wherein said window function comprises w(t) represented by $$w(t) = \{1 - a(1 - \cos(\pi t/\tau)) \quad (0 < t < 2\tau)$$
$$1 \quad (t < 0, 2\tau < t)$$

and said delay circuit delays the input signal by a time τ.

* * * * *